(12) United States Patent
Seki

(10) Patent No.: US 11,987,054 B2
(45) Date of Patent: May 21, 2024

(54) INK TUBE AND INKJET PRINTER

(71) Applicant: TOSHIBA TEC KABUSHIKI KAISHA, Tokyo (JP)

(72) Inventor: Masashi Seki, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 566 days.

(21) Appl. No.: 17/202,639

(22) Filed: Mar. 16, 2021

(65) Prior Publication Data

US 2021/0291527 A1 Sep. 23, 2021

(30) Foreign Application Priority Data

Mar. 18, 2020 (JP) ................................ 2020-047161

(51) Int. Cl.
| | | |
|---|---|---|
| *B41J 2/165* | (2006.01) | |
| *B41J 2/17* | (2006.01) | |
| *B41J 2/175* | (2006.01) | |
| *C09D 5/16* | (2006.01) | |
| *C09D 183/08* | (2006.01) | |

(52) U.S. Cl.
CPC ........... *B41J 2/1707* (2013.01); *B41J 2/1652* (2013.01); *B41J 2/175* (2013.01); *C09D 5/1675* (2013.01); *C09D 183/08* (2013.01)

(58) Field of Classification Search
CPC ...... B41J 2/16508; B41J 2/1652; B41J 2/175; B41J 2/1707; B41J 2/1606; B41J 2/045; B41J 2/04581; B41J 2/055; B41J 2/14233; B41J 2/165; B41J 2002/16502; B41J 2/1433; B41J 2/162; B41J 2/164; B41J 2/1642; C09D 171/00

See application file for complete search history.

(56) References Cited

U.S. PATENT DOCUMENTS

| | | | |
|---|---|---|---|
| 6,886,926 B2 | 5/2005 | Kaga et al. | |
| 7,267,426 B2 | 9/2007 | Miyajima et al. | |
| 10,654,273 B2 | 5/2020 | Seki | |
| 10,864,734 B2 | 12/2020 | Seki | |
| 2005/0088485 A1* | 4/2005 | Tamahashi | B41J 2/1433 347/45 |
| 2010/0302326 A1* | 12/2010 | Morohoshi | B41J 2/1606 347/105 |
| 2019/0023051 A1 | 1/2019 | Kusaka et al. | |

FOREIGN PATENT DOCUMENTS

| | | |
|---|---|---|
| CN | 2291682 Y | 9/1998 |
| CN | 1550337 A | 12/2004 |
| CN | 206334690 U | 7/2017 |
| CN | 109501458 A | 3/2019 |
| CN | 110201244 A | 9/2019 |
| CN | 110525046 A | 12/2019 |
| JP | H05115543 A | 5/1993 |

OTHER PUBLICATIONS

Chinese Office Action dated Jul. 15, 2022, mailed in counterpart Chinese Application No. 202011496658.8, 11 pages (with translation).

* cited by examiner

*Primary Examiner* — Robert D Harlan
(74) *Attorney, Agent, or Firm* — Kim & Stewart LLP

(57) ABSTRACT

An ink tube according to an embodiment includes a flexible tube body through which an ink flows, and a liquid repellent membrane which coats at least an inner surface of the flexible tube body. The liquid repellent membrane comprising a fluorine compound having a binding moiety containing a silicon atom and a carbon atom and a perfluoroalkyl group of four or fewer carbon atoms. The binding moiety is covalently bonded directly to the inner surface of the flexible tube body, and the perfluoroalkyl group is at a terminal end of the fluorine compound opposite from an end of the binding moiety.

19 Claims, 3 Drawing Sheets

INK TUBE AND INKJET PRINTER

CROSS-REFERENCE TO RELATED APPLICATION

This application is based upon and claims the benefit of priority from. Japanese Patent Application No. 2020-047161, filed on Mar. 18, 2020 the entire contents of which are incorporated herein by reference.

FIELD

Embodiments described herein relate generally to an ink tube of an inkjet printer and an inkjet printer incorporating an ink tube.

BACKGROUND

In an inkjet printer, an ink tube is used in the supply path of ink from an ink tank to an inkjet head, the supply path of a waste ink from the inkjet head to a waste ink tank, and/or the recirculation path of ink when ink circulates between the inkjet head and the ink tank. As such an ink tube, there is an ink tube composed of an olefin-based rubber, such as ethylene rubber or butadiene rubber, or an ink tube whose inner surface is composed of or coated with polytetrafluoroethylene.

DETAILED DESCRIPTION

An object to be achieved by embodiments is to provide an ink tube that maintains a state in which an ink flows easily, even after the ink tube has been used for a long period of time.

According to an embodiment, an ink tube includes a flexible tube body through which an ink flows, and a liquid repellent membrane which coats an inner surface of the tube flexible tube body. The liquid repellent membrane comprises a fluorine compound having a perfluoroalkyl group of four or fewer carbon atoms and a binding moiety that includes a silicon atom and a carbon atom. The binding moiety is covalently bonded directly to the inner surface of tube body, and the perfluoroalkyl group is at a terminal end of the fluorine compound opposite from an end of the binding moiety.

Hereinafter, certain example embodiments will be described with reference to the drawings.

1. Inkjet Printer 1-1. Configuration of Inkjet Printer

Figure 1:
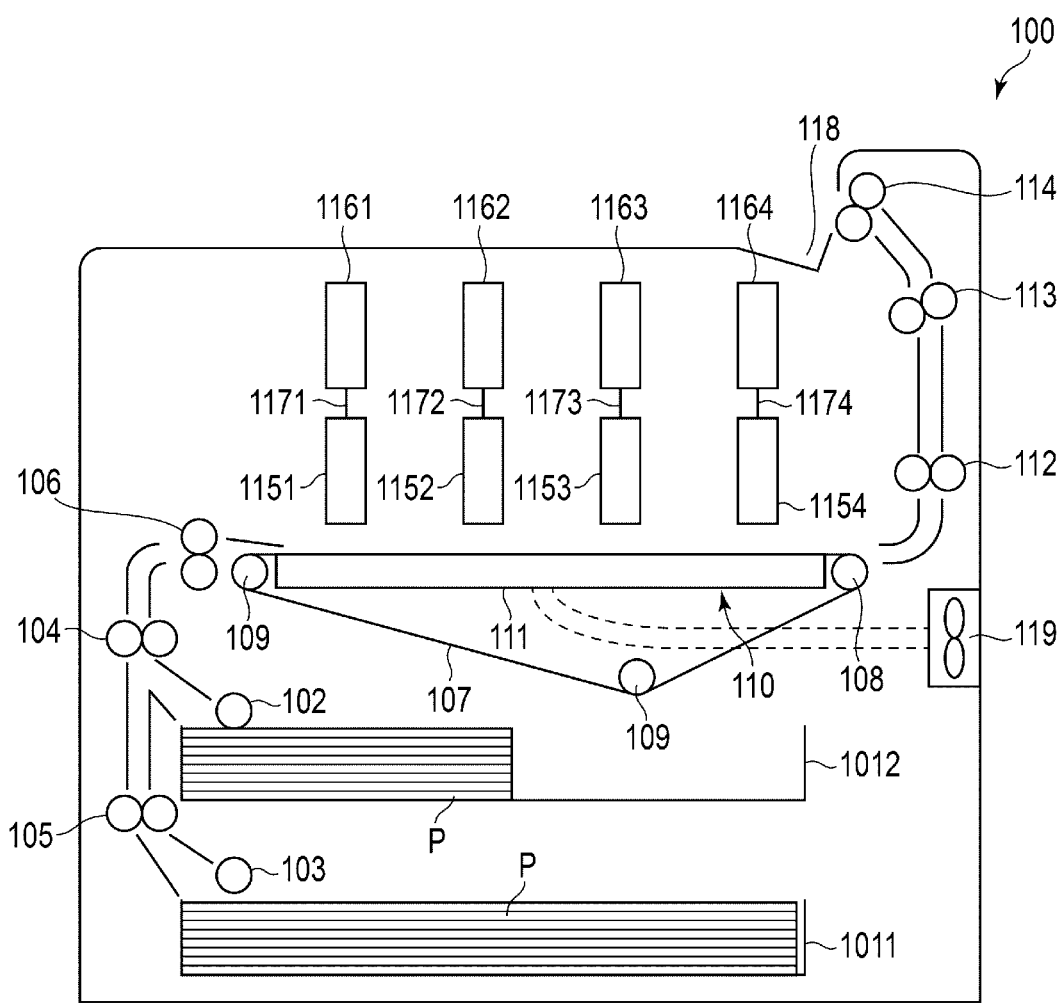
FIG. 1 a schematic view showing an inkjet printer according to an embodiment.

FIG. 1 shows a schematic view of an inkjet printer according to an embodiment.

An inkjet printer 100 shown in FIG. 1 includes inkjet heads 1151, 1152, 1153, and 1154 and a medium holding mechanism 110 that holds a recording medium (e.g., a sheet of paper) opposite the inkjet heads 1151 to 1154.

The inkjet printer 100 includes a housing provided with a paper discharge tray 118. Within the housing, cassettes 1011 and 1012, paper feed rollers 102 and 103, conveyance roller pairs 104 and 105, a registration roller pair 106, a conveyance belt 107, a fan 119, a negative pressure chamber 111, conveyance roller pairs 112, 112, and 114, inkjet heads 1151 to 1154, ink cartridges 1161, 1162, 1163, and 1164, and tubes 1171, 1172, 1173, and 1174 are placed.

The cassettes 1011 and 1012 contain recording media P with different sizes. The paper feed roller 102 or 103 picks up a recording medium P corresponding to the size of the selected recording medium from the cassette 1011 or 1012 and conveys the recording medium. P to the conveyance roller pairs 104 and 105 and the registration roller pair 106.

Tension is applied to the conveyance belt 107 by a driving roller 108 and two driven rollers 109. In the surface of the conveyance belt 107, holes are provided at predetermined intervals. Inside the conveyance belt 107, the negative pressure chamber 111 connected to the fan 119 is placed for adsorbing the recording medium P on the conveyance belt 107. The conveyance belt 107, the driving roller 108, the driven rollers 109, the negative pressure chamber 111, and the fan 119 in this example constitute the medium holding mechanism 110.

Downstream in the conveyance direction of the conveyance belt 107, the conveyance roller pairs 112 to 114 are placed. Note that in a conveyance path from the conveyance belt 107 to the paper discharge tray 118, a heater that heats a printed layer formed on the recording medium P can be placed.

Above the conveyance belt 107, four inkjet heads that eject an ink on to the recording medium P according to image data are provided. Specifically, the inkjet head 1151 ejects a cyan (C) ink, the inkjet head 1152 ejects a magenta (M) ink, the inkjet head 1153 ejects a yellow (Y) ink, and the inkjet head 1154 ejects a black (Bk) ink are provided. The inkjet heads 1151 to 1154 are disposed in ascending order from the upstream side to the downstream side.

Above the inkjet heads 1151, 1152, 1153, and 1154, the cyan (C) ink cartridge 1161, the magenta (M) ink cartridge 1162, the yellow (Y) ink cartridge 1163, and the black (Bk) ink cartridge 1164 each containing the ink corresponding thereto are placed. These ink cartridges 1161, 1162, 1163, and 1164 are connected to the inkjet heads 1151, 1152, 1153, and 1154, respectively, through the tubes 1171, 1172, 1173, and 1174, respectively.

1-2. Configuration of Inkjet Head

Figure 2:
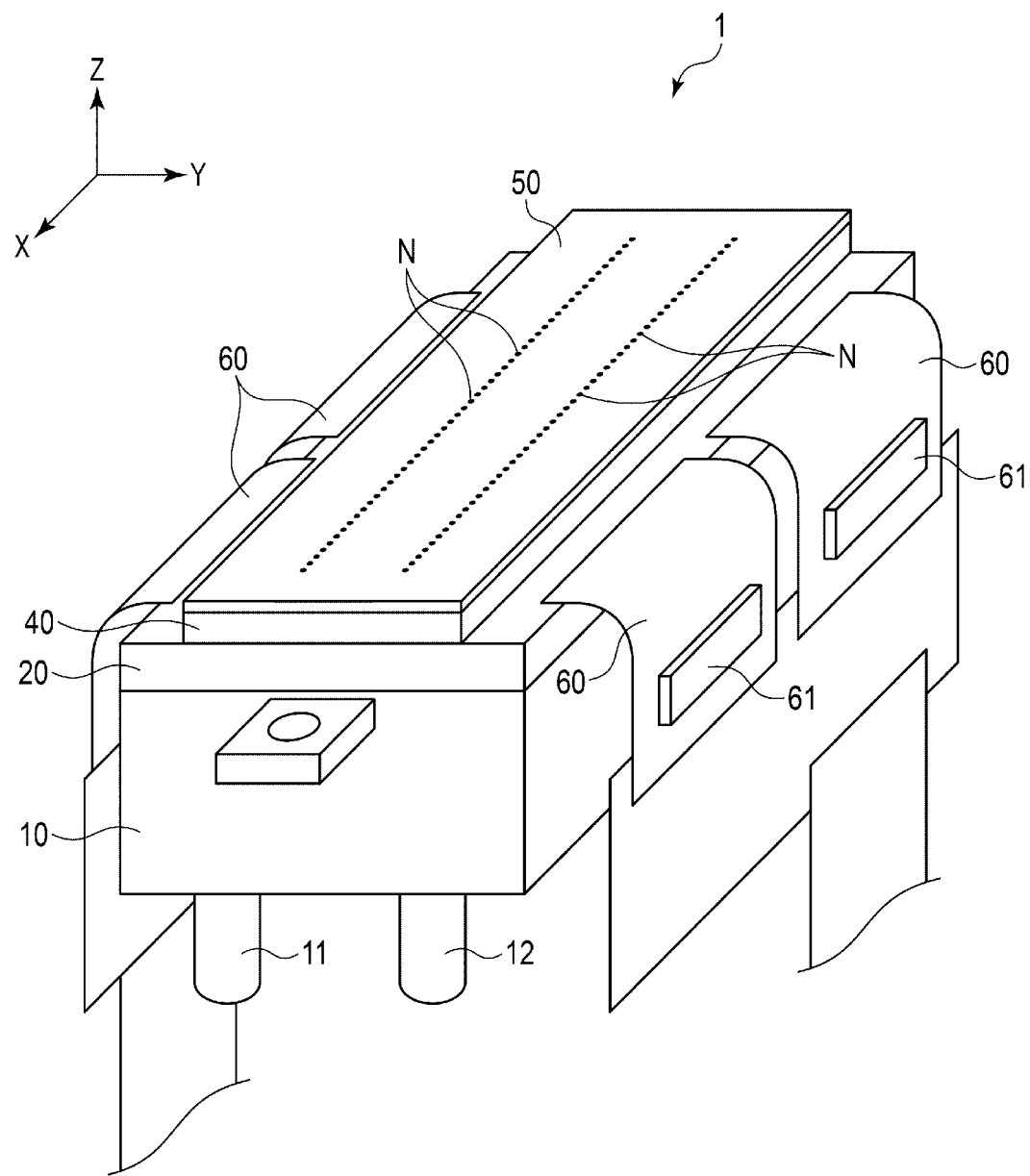
FIG. 2 is a perspective view showing an example of an inkjet head that can be used in an inkjet printer.

FIG. 2 shows an example of an inkjet head that can be used in the inkjet printer depicted in FIG. 1. In the following description, an orthogonal coordinate system formed by X axis, Y axis, and Z axis is used for explanatory convenience, however such coordination system is not a requirement or limitation of the present disclosure. A direction indicated by an arrow at the end of a coordinate axis in the drawings is defined as "plus direction" for the sake of convenience. The X-axis direction corresponds to a print width direction. The Y-axis direction corresponds to a direction in which a recording medium is conveyed during the print operations. The Z-axis plus direction is a direction above the printing surface of the recording medium.

An inkjet head 1 shown in FIG. 2 is a so-called shear mode shared wall side-shooter type. In the inkjet printer 100 in FIG. 1, an end-shooter type inkjet head may be used instead.

The inkjet head 1 includes an ink manifold 10, an actuator plate 20, a frame 40, and a nozzle plate 50.

The ink manifold 10 has a rectangular parallelepiped shape with the X-axis direction as a longitudinal (length) direction. Inside the ink manifold 10, an ink supply path and an ink discharge path are provided. In the ink supply path, an opening extending in the X-axis direction is formed in a central portion (along the Y-axis direction) in a surface facing the actuator plate 20 of the ink manifold 10. In the ink discharge path, two openings adjacent to each other in the Y-axis direction across the opening of the ink supply path and each extending in the X-axis direction are formed in a surface facing the actuator plate 20 of the ink manifold 10. An ink supply tube 11 and an ink return tube 12 are connected, respectively to the ink supply path and the ink discharge path.

The actuator plate 20 has a rectangular shape with the X-axis direction as a longitudinal direction. The actuator plate 20 is overlapped on the ink manifold 10 so as to close the openings of the ink supply path and the ink discharge path provided in the ink manifold 10. The actuator plate 20 is provided with a plurality of ink supply ports arranged at intervals along the X-axis direction at a position corresponding to the opening of the ink supply path. Further, the actuator plate 20 is provided with a plurality of ink discharge ports arranged at intervals along the X-axis direction at each of the positions corresponding to the two openings of the ink discharge path.

Between the row of the ink supply ports and one of the rows of the ink discharge ports, a plurality of piezoelectric members are provided. These piezoelectric members form a row extending in the X-axis direction. Furthermore, a plurality of piezoelectric members are also provided between the row of the ink supply ports and the other row of the ink discharge ports. These piezoelectric members also forma row extending in the X-axis direction.

Each of the rows composed of the plurality of piezoelectric members is constituted by first and second piezoelectric bodies sequentially stacked on the actuator plate 20. The first and second piezoelectric bodies are polarized in mutually opposite directions along the thickness direction. A stacked body composed of the first and second piezoelectric bodies is provided with a plurality of grooves each extending in the Y-axis direction and arranged in the X-axis direction. These grooves open at the second piezoelectric body side and have a depth greater than the thickness of the second piezoelectric body.

A space in each groove acts a pressure chamber communicating with a nozzle N. On a side wall and a bottom surrounding the pressure chamber, electrodes are formed. These electrodes are connected to a wiring pattern extending along the Y-axis direction. The electrodes apply a drive pulse to the piezoelectric members.

Note a flexible printed circuit board 60 is connected to the wiring pattern at a position on the actuator plate 20 but outside the frame 40. On the flexible printed circuit board 60, a drive circuit 61 for driving the piezoelectric members is mounted.

The frame 40 is attached to the actuator plate 20. The frame 40 surrounds the arrangement of the plurality of piezoelectric members. A space surrounded by the frame 40 communicates with the ink supply ports and the ink discharge ports of the actuator plate 20.

The nozzle plate 50 is attached to the frame 40. The nozzle plate 50 faces the actuator plate 20 with the frame 40 and the piezoelectric members interposed therebetween. In the nozzle plate 50, a plurality of nozzles N are provided at predetermined intervals such that two rows extending in the X-axis direction and spaced from each other in the Y-axis direction are formed. The nozzles N in one of the rows communicate with the pressure chambers formed by the plurality of piezoelectric members provided between the row of the ink supply ports and one of the rows of the ink discharge ports, respectively. The nozzles N in the other row communicate with the pressure chambers formed by the plurality of piezoelectric members provided between the row of the ink supply ports and the other row of the ink discharge ports, respectively.

The actuator plate 20, the frame 40, and the nozzle plate 50 are combined with each other and form a hollow structure. A region surrounded by the actuator plate 20, the frame 40, and the nozzle plate 50 forms an ink flow chamber. The ink is supplied to the ink flow chamber from the ink cartridge through a flow path including the ink supply tube 11, the ink supply path of the ink manifold 10, and the ink supply port of the actuator plate 20. Subsequently, the ink passes through the pressure chamber, and a portion of the ink is ejected from a nozzle N in a printing process. The rest of the ink is returned to the ink cartridge through a flow path including the ink discharge port of the actuator plate 20, the ink discharge path of the ink manifold 10, and the ink return tube 12.

1-3. Image Formation

Next, an image forming operation of the inkjet printer 100 shown in FIG. 1 will be described.

First, an image processing unit starts image processing for recording and generates an image signal corresponding to image data and also generates a control signal for controlling operations of various rollers, the negative pressure chamber 111, and the like.

The paper feed roller 102 or 103 picks up a recording medium P of a selected size one by one from the cassette 1011 or 1012 under the control of the image processing unit, and conveys the recording medium P to the conveyance roller pairs 104 and 105 and the registration roller pair 106. The registration roller pair 106 corrects a skew of the recording medium P and then conveys the recording medium P onward at a predetermined timing appropriate to the printing process.

The negative pressure chamber 111 sucks air through the holes of the conveyance belt 107 and hold the recording medium P to the conveyance belt 107 as it moves. Therefore, the recording medium P is sequentially conveyed to the positions below the inkjet heads 1151 to 1154 by the movement of the conveyance belt 107 while held on the conveyance belt 107.

The inkjet heads 1151 to 1154 eject the ink in synchronization with the timing at which the recording medium P was conveyed past the registration rollers 106. The ejections from the inkjet heads 1151 to 1154 are under the control of the image processing unit. In this manner, a color image is formed at a desired position on the recording medium P.

Thereafter, the conveyance roller pairs 112 to 114 operate to discharge the recording medium P on which the image has been formed to the paper discharge tray 118. When a heater is placed on the conveyance path from the conveyance belt 107 to the paper discharge tray 118, the printed layer formed on the recording medium P may be heated by the heater. When heating is performed by the heater, particularly, if the recording medium P is impermeable, the adhesiveness of the printed layer to the recording medium P can be enhanced.

2. Ink Tube 2-1. Configuration of Ink Tube

In the inkjet printer 100 described above, a tube is used in a flow path of an ink, and an ink tube as described below can be used for such purposes.

Figure 3:
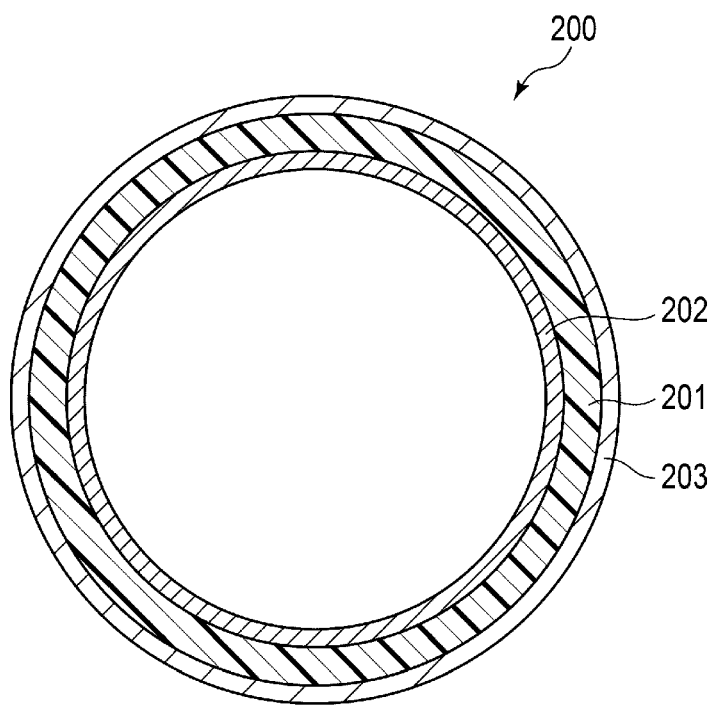
FIG. 3 is a cross-sectional view of an ink tube according to an embodiment.

FIG. 3 shows a cross-section of an ink tube according to an embodiment.

An ink tube 200 shown in FIG. 3 includes a tube body 201 and a first liquid repellent membrane 202 and a second liquid repellent membrane 203.

The tube body 201 is a flexible tube through which an ink flows. The tube body 201 is composed of a polymer. The tube body 201 may have a single layer structure or a multilayer structure. As a material of the tube body 201, for example, one or more of polyethylene terephthalate, vinyl chloride, silicone, polyurethane, and polyamide can be used. As a polyamide, for example, an aliphatic polyamide such as nylon can be used. When such a material is used, a tube having excellent flexibility can be obtained. Furthermore, the tube composed of such a material is generally inexpensive as compared with a tube composed of polytetrafluoroethylene or the like.

The thickness of a wall portion of the tube body 201 is preferably within a range of 1 to 10 µm, more preferably within a range of 1 to 5 µm. When the wall portion of the tube body 201 is made thin, the strength of the ink tube 200 is deteriorated. When the wall portion of the tube body 201 is made thick, the flexibility of the ink tube 200 is deteriorated.

The inner diameter of the tube body 201 is preferably within a range of 1 to 20 mm, more preferably within a range of 2 to 5 mm. When the inner diameter of the tube body 201 is decreased, the first liquid repellent membrane 202 might not be well formed, and/or the ink hardly flows. When the inner diameter of the tube body 201 is increased, a change in the volume of the ink tube 200 due to a change in pressure or temperature is likely to occur. Further, when the inner diameter of the tube body 201 is increased, the linear velocity of the flow of the ink passing through the tube is decreased. Note that as compared with the inner diameter of the tube body 201, the thickness of the first liquid repellent membrane 202 is relatively small. In general, the thickness of the first liquid membrane 202 is such that the thickness can be ignored relative to the inner diameter of the tube body 201, and therefore, the inner diameter of the ink tube 200 can be considered substantially equal to the inner diameter of the tube body 201.

The first liquid repellent membrane 202 coats an inner surface of the tube body 201. The first liquid repellent membrane 202 comprises a fluorine compound with a binding moiety containing a silicon atom and a carbon atom at the tube body 201 side and a perfluoroalkyl group having 4 or less carbon atoms at the outward facing surface side (side facing away from inner surface of the tube body 201).

The second liquid repellent membrane 203 coats an outer surface of the tube body 201. The second liquid repellent membrane 203 contains the same fluorine compound as contained in the first liquid repellent membrane 202. In some examples, the second liquid repellent membrane 203 may contain or comprise a compound different from the first liquid repellent membrane 202. The second liquid repellent membrane 203 can be omitted in some examples.

The ink tube 200 can be used as at least a portion of a tube of an ink flow path included in the inkjet printer 100.

For example, the ink tube 200 can be used as a portion of a tube or the whole of a tube included in the supply path of the ink to the inkjet head from the ink tank. For example, the ink tube 200 can be used as at least one of the tubes 1171, 1172, 1173, and 1174 in FIG. 1, or as a tube connected to the ink supply tube 11 in FIG. 2.

Alternatively, the ink tube 200 can be used as a portion or the whole of a tube included in the supply path of the waste ink to the waste ink tank from the inkjet head. For example, the ink tube 200 can be used as a tube connected to the ink return tube 12 in FIG. 2.

Alternatively, the ink tube 200 can be used as a portion or the whole of a tube included in the supply path of the ink to the inkjet head from the ink tank and also can be used as a portion or the whole of a tube included in the supply path of the waste ink to the waste ink tank from the inkjet head.

Alternatively, when the ink is circulated, the ink tube 200 can be used as a portion or the whole of a tube included in the circulation path of the ink.

2-2. Liquid Repellent Membrane

The fluorine compound contained in the ink tube 200, the first liquid repellent membrane 202, and the second liquid repellent membrane 203 preferably has a structure as described below.

Figure 4:
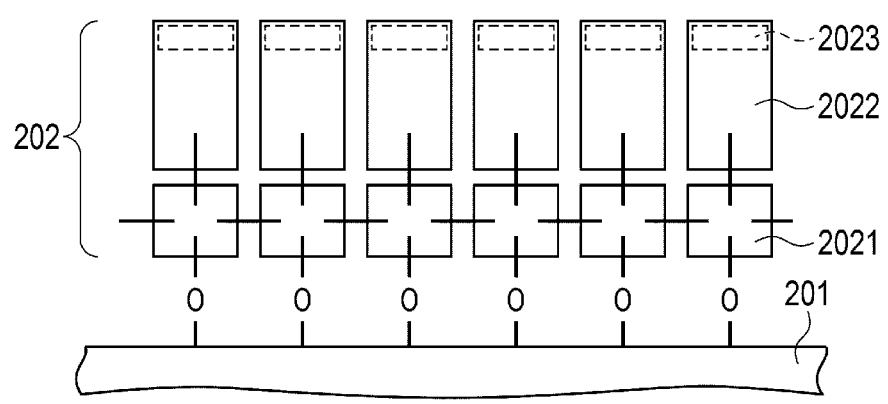
FIG. 4 is a schematic view depicting an example of a liquid repellent membrane.

FIG. 4 is a schematic view showing an example of the first liquid repellent membrane 202.

The first liquid repellent membrane 202 shown in FIG. 4 is a monomolecular layer of a fluorine compound. The fluorine compound includes a binding moiety 2021, a spacer linking group 2022, and a terminal perfluoroalkyl group 2023. The fluorine compound is a generally linear molecule including the binding moiety 2021 at one terminal end, the perfluoroalkyl group 2023 at the other terminal end, with the spacer linking group 2022 therebetween.

The binding moiety 2021 is bonded to the tube body 201 by a reaction with a functional group present on the surface of the tube body 201.

The fluorine compound used as a raw material in the making of the first liquid repellent membrane 202 includes, for example, a reactive functional group as a moiety corresponding to the binding moiety 2021. In that case, by reacting the reactive functional group with the functional group present on the surface of the tube body 201, the binding moiety 2021 bonds (e.g., covalently bonds) to the tube body 201. The reactive functional group in the fluorine compound that is a precursor of the first liquid repellant membrane 202 is, for example, a hydroxy group, an epoxy group, an amino group, an unsaturated hydrocarbon group, such as a methacrylic group or a vinyl group, or a mercapto group. The functional group present on the surface of the tube body 201 is, for example, a hydroxy group, an ester bond, an amino group, or a thiol group.

Alternatively, in the first liquid repellent membrane 202 precursor material, a moiety corresponding to the binding moiety 2021 includes an alkoxysilyl group. In such a case, by reacting a silanol group generated by hydrolysis of the alkoxysilyl group with the functional group, such as a hydroxy group, present on the surface of the tube body 201, the binding moiety 2021 can bond to the tube body 201.

Alternatively, in the first liquid repellent membrane 202 precursor, a moiety corresponding to the binding moiety 2021 includes an alkoxysilyl group and another reactive functional group. Here, the other reactive functional group is, for example, a hydroxy group, an epoxy group, an amino group, or an unsaturated hydrocarbon group such as a methacrylic group or a vinyl group, or a mercapto group. In that case, for example, by reacting other reactive functional group with the functional group present on the surface of the tube body 201, the binding moiety 2021 can be bonded to the tube body 201. Furthermore, by subjecting a silanol group generated by hydrolysis of the alkoxysilyl group to a dehydration condensation reaction, an intermolecular bond can be formed between adjacent fluorine compounds on the surface of the tube body 201. That is, for the fluorine compounds adjacent to each other on the tube body 201, the binding moieties 2021 bond to each other.

According to one example, the binding moiety 2021 further contains one or more silicon atoms between the reactive functional group and the spacer linking group 2022, and, in such a case, the fluorine compounds adjacent to each other on the tube body 201, the binding moieties 2021 can bond to each other via a siloxane bond (Si—O—Si).

The terminal perfluoroalkyl group 2023 is, for example, a linear perfluoroalkyl group. The number of carbon atoms of the terminal perfluoroalkyl group 2023 can be selected within a range of 4 or less (methyl (C1) to butyl (C4)). The terminal perfluoroalkyl group 2023 is preferably upright along the perpendicular line direction with respect to the surface of the tube body 201. When the number of carbon atoms of the terminal perfluoroalkyl group 2023 is increased, it becomes easier to make the terminal perfluoroalkyl group 2023 upright, but generally such a longer terminal perfluoroalkyl group may have an adverse effect on the human body such as carcinogenicity.

The spacer linking group 2022 links the terminal perfluoroalkyl group 2023 to the binding moiety 2021. The presence of the spacer linking group 2022 is advantageous in that the terminal perfluoroalkyl group 2023 has an upright structure along the perpendicular line direction with respect to the surface of the tube body 201. The spacer linking group 2022 is, for example, a perfluoropolyether group.

As a raw material (precursor) of a first liquid repellent membrane 202, a fluorine compound represented by the following general formulas (1) or (2) can be used, for example.

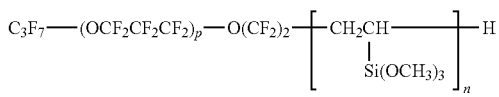

(1)

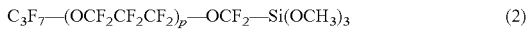

(2)

In the general formulae (1) and (2), p is a natural number between 1 and 50 and n is a natural number between 1 and 10.

A first liquid repellent membrane 202 produced by such precursor has a thickness of, for example, about 10 nm when formed as monomolecular coating.

The first liquid repellent membrane 202 shown in FIG. 4 can be obtained as follows. Note that here, as one example, the precursor fluorine compound of the first liquid repellent membrane 202 includes an alkoxysilyl group in the moiety corresponding to the binding moiety 2021.

The tube body 201 is composed of a polymer as described above. The inner surface of the tube body 201 sometimes includes almost no hydroxy groups that are required for bonding to the fluorine compound. In such case, the tube body 201 is preferably subjected to a pretreatment process prior to the formation of the first liquid repellent membrane 202.

For example, the tube body 201 is inserted into a pair of cylindrical electrodes. These cylindrical electrodes have an inner diameter close to the outer diameter of the tube body 201. The cylindrical electrodes are separated from each other with a small gap therebetween. Next, the inside of the tube body 201 is brought into a reduced pressure state, and an argon-oxygen mixed gas is allowed to flow in the tube body 201. In this state, one of the cylindrical electrodes is grounded, and a high-frequency voltage is applied to the other cylindrical electrode, whereby a plasma is generated at the surface of the tube body 201. Then, while holding the positions of the cylindrical electrodes fixed, the tube body 201 is moved between the cylindrical electrodes. In this manner, the entire inner surface of the tube body 201 is subjected to a plasma treatment along its length.

By performing an ion plasma treatment in an atmosphere containing oxygen, the inner surface of the tube body 201 will be modified with a hydroxy group. In addition thereto, by performing the ion plasma treatment in an atmosphere containing argon, dirt adhered to the inner surface of the tube body 201 will be removed.

The ion plasma treatment is preferably performed in an argon-oxygen mixed gas having an oxygen concentration of 50 vol % or less, more preferably performed in an argon-oxygen mixed gas having an oxygen concentration within a range of 20 to 50 vol %. When the oxygen concentration is too high, the inner surface of the tube body 201 may be damaged to cause surface roughness. When roughness is caused on the inner surface of the tube body 201, the binding of the first liquid repellent membrane 202 to the inner surface may be insufficient.

Subsequently, the fluorine compound precursor is supplied to the inner surface of the tube body 201. This supplying is performed by, for example, dipping the tube body 201 in a liquid containing the fluorine compound, allowing a liquid containing the fluorine compound to flow in the tube body 201, or vaporizing the fluorine compound and allowing the vaporized fluorine compound to flow in the tube body 201.

The alkoxysilyl group of the fluorine compound supplied to the inner surface of the tube body 201 is hydrolyzed.

When the alkoxysilyl group of the fluorine compound is hydrolyzed, a silanol group is generated. The silanol group and the hydroxy group present on the inner surface of the tube body 201 can react in a dehydration condensation type reaction. In this manner, the tube body 201 and the fluorine compound bond to each other through a siloxy group (Si—O—) formed by a silicon atom contained in the binding moiety 2021. Furthermore, silicon atoms of the binding moieties 2021 in the fluorine compounds adjacent to each other bond to each other through a siloxane bond (Si—O—Si).

The terminal perfluoroalkyl group 2023 is bound to the silicon atom of the binding moiety 2021 through the perfluoropolyether group that is the spacer linking group 2022. The spacer linking group 2022 has a function of promoting or causing the terminal perfluoroalkyl group 2023 to be upright along the perpendicular line direction with respect to the inner surface of the tube body 201 as described above.

Accordingly, the first liquid repellent membrane 202 shown in FIG. 4 is obtained.

Alternatively, as the raw material precursor of the first liquid repellent membrane 202, a fluorine compound in which a moiety that becomes the binding moiety 2021 includes an alkoxysilyl group and a reactive functional group R as represented by the following general formula (3).

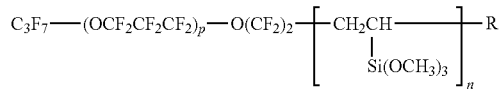

(3)

In the general formula (3), p is a natural number between 1 and 50, n is a natural number between 1 and 10, and R is the above-mentioned reactive functional group. Preferably a plurality of alkoxysilyl groups (n>1) are used in this example.

A first liquid repellent membrane 202 formed by such a precursor material also has a thickness of, for example, about 10 nm.

When the fluorine compound with a moiety corresponding to the binding moiety 2021 that includes an alkoxysilyl group and a reactive functional group R is used, the first liquid repellent membrane 202 shown in FIG. 4 can be obtained, for example, as follows.

First, the fluorine compound is supplied to the inner surface of the tube body 201 in the same manner as described above. Then, a reaction of the reactive functional group R with the inner surface of the tube body 201 is caused, thereby bonding the fluorine compound to the inner surface of the tube body 201. Note that the above-mentioned pretreatment may be performed prior to the supply of the fluorine compound to the inner surface of the tube body 201.

Subsequently, the alkoxysilyl group of the fluorine compound is hydrolyzed. Then, dehydration condensation of silanol groups is caused between the fluorine compounds adjacent to each other. In this manner, an intermolecular bond between the adjacent fluorine compound molecules is formed.

In this manner, the first liquid repellent membrane 202 shown in FIG. 4 is obtained.

In this method, the fluorine compound is bonded to the inner surface of the tube body 201 prior to the formation of an intermolecular bond between the fluorine compound molecules. Therefore, this method is advantageous in obtaining a structure in which the terminal perfluoroalkyl group 2023 is upright along the perpendicular line direction with respect to the inner surface of the tube body 201.

In this first liquid repellent membrane 202 formed thusly, the terminal perfluoroalkyl group 2023 mainly provides the liquid repellency since, as shown in FIG. 4, the terminal perfluoroalkyl group 2023 is upright along the perpendicular line direction with respect to the inner surface of the tube body 201. In general, a $CF_3$ group contributes more to the liquid repellency than a $CF_2$ group. When an ion plasma treatment using an argon-oxygen mixed gas is performed or when a fluorine compound including a reactive functional group R is used, the fluorine compound generally bonds to the inner surface of the tube body 201 at a high density (surface coverage). That is, on the surface of the first liquid repellent membrane 202, a $CF_3$ group (that contributes to the liquid repellency more significantly than a $CF_2$ group) is present at a high density. Therefore, the first liquid repellent membrane 202 exhibits good liquid repellency.

Further, in such a first liquid repellent membrane 202, the binding moieties 2021 in the fluorine compounds adjacent to each other bind to each other. Therefore, in the ink tube 200, even if the ink is allowed to flow therethrough many times, breaking or peeling of the first liquid repellent membrane 202 hardly occurs.

In addition, the first liquid repellent membrane 202 is thin and has the above-mentioned structure, and therefore, a crack will be unlikely to occur in such a membrane when the ink tube 200 is bent.

With such a first liquid repellent membrane 202, even if the ink flow rate is changed, the terminal perfluoroalkyl group 2023 only swings in the lateral direction and never disappears from the surface of the first liquid repellent membrane 202. Therefore, even if the ink is allowed to flow through the ink tube 200 many times, deterioration in the liquid repellency is avoided.

In a determination as to whether or not a liquid repellent membrane has the above-mentioned structure, an analysis using an X-ray photoelectron spectroscopy (XPS) method can be utilized.

When the first liquid repellent membrane 202 is analyzed by the XPS method, a peak of a $CF_2$ group, a peak of a $CF_3$ group, and a peak of a $CF_{3+\delta}$ group having a higher binding energy than the $CF_3$ group are detected.

The principle of XPS is as follows.

When a material is irradiated with a soft X-ray of about several kilo electron volts (keV), an electron in an atomic orbital absorbs the light energy and is struck out as a photoelectron. The binding energy $E_b$ of a bound electron and the kinetic energy $E_k$ of the photoelectron have the following relationship.

$$E_b = h_\nu - E_k - \psi_{sp}$$

Here, $h_\nu$ is the energy of the incident X-ray, and $\psi_{sp}$ is the work function of the spectrometer.

Therefore, if the energy of the X-ray is constant (that is, a single wavelength), the binding energy $E_b$ of the electron can be determined based on the kinetic energy $E_k$ of the photoelectron. The binding energy $E_b$ of the electron is intrinsic to the element, and therefore, an elemental analysis can be performed. Further, a binding energy shift reflects the chemical bonding state or the valence state (oxidation number or the like) of the element, and therefore, the chemical bonding state of a constituent element can be examined.

Note that the peak of the "$CF_{3+\delta}$ group" is a peak detected as if the $CF_{3+\delta}$ group has a larger binding energy than the $CF_3$ group caused by overlapping of the $CF_3$ groups of the terminal perfluoroalkyl groups adjacent to each other. That is, the appearance of the peak of $CF_{3+\delta}$ means that the fluorine compound bonds to the tube body 201 at a high density, more particularly, the $CF_3$ group is present at a high density near the surface of the liquid repellent membrane.

When the peak area of the $CF_2$ group is assumed to be 1, the ratio of the peak area of the $CF_3$ group is, for example, between 0.1 and 0.3. When the number of carbon atoms of the terminal perfluoroalkyl group 2023 is 4, this ratio is about 0.3. Further, this ratio approaches 0.1 as the number of carbon atoms of the terminal perfluoroalkyl group 2023 approaches 7.

3. Effects

The ink tube 200 includes the first liquid repellent membrane 202 on the inner surface. The first liquid repellent membrane 202 shows high liquid repellency as described above. The first liquid repellent membrane 202 does not experience substantial deterioration in liquid repellency due to changes in the conformation of the fluorine compound, and also hardly experiences breaking or peeling. Therefore, the first liquid repellent membrane 202 can maintain high liquid repellency even when the first liquid repellent membrane 202 remains in contact with the ink for a long period of time or when the ink is allowed to flow many times through the ink tube 200. Accordingly, the ink tube 200 maintains a state in which the ink is able to easily flow even after the ink tube 200 has been used for a long period of time.

Furthermore, as described above, a crack hardly occurs in the first liquid repellent membrane 202 when the ink tube 200 is bent. Therefore, when a tube having high flexibility is used as the tube body 201, the ink tube 200 can still be greatly deformed (bent) without causing a crack in the first liquid repellent membrane 202. Accordingly, when the ink tube 200 is used, the degree of freedom associated with the placement of the flow path of the ink is increased.

The first liquid repellent membrane 202 has excellent liquid repellency, strength, and durability, and therefore, high resistance to the ink is not required to be supplied by the tube body 201 itself. Therefore, in an ink tube 200, various materials can be used for the tube body 201. For example, an inexpensive material that has excellent flexibility but low resistance to the ink can be used for the tube body 201.

EXAMPLES

The performance of the liquid repellent membrane described above was confirmed as follows.

Test Example

First, a film composed of polyimide was prepared. Subsequently, the film was subjected to a plasma treatment in a reduced pressure atmosphere containing an argon-oxygen mixed gas. Subsequently, a fluorine compound was supplied to this film by a vacuum deposition method. Then, hydrolysis and dehydration condensation were caused, thereby binding the fluorine compound to the surface of the film and also allowing intermolecular bonding of the fluorine compound to occur. The fluorine compound used here is a compound, which is represented by the above general formula (1), and in which p and n are 1 and 10, respectively. In this manner, a composite film having a liquid repellent membrane on the film was formed.

Comparative Example

First, the same film as used in the Test Example was prepared. Subsequently, the film was subjected to the same plasma treatment as performed for Test Example. Subsequently, on the film, a membrane composed of CYTOP® (Type A) manufactured by Asahi Glass Co., Ltd., which is a fluorine compound, was formed. The fluorine compound used here is a compound having a terminal group containing an alkoxysilane group at both terminals of a polymer main chain represented by the following chemical formula (4). Then, hydrolysis and dehydration condensation were caused, thereby binding the fluorine compound to the surface of the film. In this manner, a composite film having a liquid repellent membrane on the film was formed.

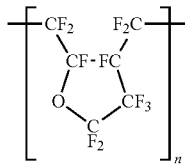

(4)

Testing

Each of the composite films of Test Example and Comparative Example was cut to a width of 15 mm. Each of these samples was dipped in an inkjet ink for several seconds with the principal face of the sample held parallel to the gravity direction. Then, only a portion with a length of 45 mm of each sample was pulled up from the ink, and a time required for the ink to disappear from the pulled-up portion was measured. For each sample, the ink disappeared from the pulled-up portion immediately after the portion was pulled up from the ink.

Next, the same two sample types were prepared again, and each of these samples was dipped in an inkjet ink for 90 days with the principal face held parallel to the gravity direction. At the end of the 90 days, a portion of each sample having a length of 45 mm was pulled up from the ink, and the time required for the ink to disappear from the pulled-up portion was measured. In the sample obtained from the composite film of Test Example, the ink disappeared from the pulled-up portion immediately after the portion was pulled up from the ink in the same manner as the previous test where the sample was dipped in the ink for only several seconds. For the sample obtained from the composite film of Comparative Example, the ink did not disappear from the portion pulled up from the ink. As the reason why the decrease in liquid repellency occurred for Comparative Example, it is considered that the conformation of the fluorine compound in the liquid repellent membrane changed over time in the ink, and the group(s) that contributes the most to the liquid repellency was reduced in prevalence at the surface of the liquid repellent membrane of the Comparative Example.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An ink tube, comprising:
   a flexible tube body; and
   a liquid repellent film which coats an inner surface of the flexible tube body, the liquid repellent membrane comprising a fluorine compound having a perfluoroalkyl group of four or fewer carbon atoms and a binding moiety containing a silicon atom and a carbon atom, the binding moiety being covalently bonded directly to the inner surface of the flexible tube body, and the perfluoroalkyl group being at a terminal end of the fluorine compound opposite from an end of the binding moiety.

2. The ink tube according to claim 1, wherein, in the liquid repellent film, silicon atoms of the binding moieties of adjacent fluorine compounds on the inner surface of the flexible tube body are bonded to each other via an oxygen atom.

3. The ink tube according to claim 1, wherein, in the liquid repellent film, silicon atoms of the binding moieties of adjacent fluorine compounds on the inner surface of the flexible tube body are bonded to each other via a siloxane linkage.

4. The ink tube according to claim 1, wherein, in the liquid repellent film, silicon atoms of the binding moieties of adjacent fluorine compounds on the inner surface of the flexible tube body are bonded to each other via a linkage including a carbon atom.

5. The ink tube according to claim 1, wherein the fluorine compound further includes a perfluoropolyether group between the binding moiety and the perfluoroalkyl group.

6. The ink tube according to claim 1, wherein the flexible tube body is composed of at least one material selected from the group consisting of a polyethylene terephthalate, a polyvinyl chloride, a silicone, a polyurethane, and a polyamide.

7. The ink tube according to claim 1, wherein the flexible tube body is a polyamide.

8. The ink tube according to claim 1, wherein the flexible tube body is nylon.

9. The ink tube according to claim 1, further comprising:
another liquid repellent film coating an outer surface of the flexible tube body, this other liquid repellent film also comprising the fluorine compound.

10. The ink tube according to claim 1, wherein the liquid repellent film is a monomolecular coating.

11. An inkjet printer, comprising:
an inkjet head;
an ink tube forming at least a portion of a flow path of ink to or from the inkjet head, wherein the ink tube comprises:
a flexible tube body; and
a liquid repellent film which coats an inner surface of the flexible tube body, the liquid repellent membrane comprising a fluorine compound having a perfluoroalkyl group of four or fewer carbon atoms and a binding moiety containing a silicon atom and a carbon atom, the binding moiety being covalently bonded directly to the inner surface of the flexible tube body, and the perfluoroalkyl group being at a terminal end of the fluorine compound opposite from an end of the binding moiety.

12. The inkjet printer according to claim 11, wherein, in the liquid repellent film, silicon atoms of the binding moieties of adjacent fluorine compounds on the inner surface of the flexible tube body are bonded to each other via an oxygen atom.

13. The inkjet printer according to claim 11, wherein, in the liquid repellent film, silicon atoms of the binding moieties of adjacent fluorine compounds on the inner surface of the flexible tube body are bonded to each other via a siloxane linkage.

14. The inkjet printer according to claim 11, wherein, in the liquid repellent film, silicon atoms of the binding moieties of adjacent fluorine compounds on the inner surface of the flexible tube body are bonded to each other via a linkage including a carbon atom.

15. The inkjet printer according to claim 11, wherein the fluorine compound further includes a perfluoropolyether group between the binding moiety and the perfluoroalkyl group.

16. The inkjet printer according to claim 11, wherein the flexible tube body is composed of at least one material selected from the group consisting of a polyethylene terephthalate, a polyvinyl chloride, a silicone, a polyurethane, and a polyamide.

17. The inkjet printer according to claim 11, wherein the flexible tube body is a polyamide.

18. The inkjet printer according to claim 11, wherein the ink tube further comprises:
another liquid repellent film coating an outer surface of the flexible tube body, this other liquid repellent film also comprising the fluorine compound.

19. The inkjet printer according to claim 11, wherein the liquid repellent film is a monomolecular coating.

* * * * *